(12) United States Patent
Lovén Svensson (10) Patent No.: US 8,749,575 B2
(45) Date of Patent: Jun. 10, 2014

(54) DISPLAY CONTROLLER, ELECTRONIC APPARATUS AND METHOD FOR CREATING A TRANSLUCENCY EFFECT USING COLOR MODEL TRANSFORM

(75) Inventor: Maria Lovén Svensson, Lund (SE)

(73) Assignee: Telefonaktiebolaget L M Ericssson (publ), Stockholm (SE)

( * ) Notice: Subject to any disclaimer, the term of this patent is extended or adjusted under 35 U.S.C. 154(b) by 1310 days.

(21) Appl. No.: 12/527,859

(22) PCT Filed: Mar. 4, 2008

(86) PCT No.: PCT/EP2008/001693
§ 371 (c)(1),
(2), (4) Date: Dec. 6, 2009

(87) PCT Pub. No.: WO2008/107154
PCT Pub. Date: Sep. 12, 2008

(65) Prior Publication Data
US 2010/0085378 A1    Apr. 8, 2010

Related U.S. Application Data

(60) Provisional application No. 60/893,421, filed on Mar. 7, 2007, provisional application No. 60/940,703, filed on May 30, 2007.

(30) Foreign Application Priority Data

May 29, 2007    (EP) ..................................... 07109127

(51) Int. Cl.
*G09G 5/02*    (2006.01)

(52) U.S. Cl.
USPC ........... 345/604; 345/600; 345/420; 345/418; 345/605; 345/422; 345/591; 345/582; 345/502; 382/162; 382/165; 382/294; 382/166; 358/504; 358/1.9; 358/520; 358/518

(58) Field of Classification Search
USPC ......... 382/162, 165, 294, 103, 166, 358, 504, 382/1.9, 520, 518; 345/600, 420, 418, 605, 345/422, 591, 582, 419, 604, 502; 358/504, 358/1.9, 520, 518
See application file for complete search history.

(56) References Cited

U.S. PATENT DOCUMENTS 5,351,067 A * 9/1994 Lumelsky et al. ............ 345/561
(Continued)

FOREIGN PATENT DOCUMENTS

| EP | 0 524 461 A | 1/1993 | |
|---|---|---|---|
| WO | 2005/083672 A | 9/2005 | |
| WO | WO 2005083672 A2 * | 9/2005 | ............. G09G 5/393 |

OTHER PUBLICATIONS

PCT International Search Report, mailed May 13, 2008, in connection with International Application No. PCT/EP2008/001693.

(Continued)

*Primary Examiner* — Abderrahim Merouan
(74) *Attorney, Agent, or Firm* — Leffler Intellectual Property Law, PLLC; Kenneth B. Leffler (57) ABSTRACT

A display controller is configured for creating a translucency effect for a target image area of a source image containing image data expressed in a first color model. The display controller has a first color model converter adapted for color model transformation of the image data from the first color model to a second color model based upon a first predefined set of transformation coefficients, as well as a second color model converter adapted for color model transformation of the image data from the first color model to the second color model based upon a second predefined set of transformation coefficients. The display controller is controllable to produce a destination image by selecting transformed image data from the second color model converter for the target image area and by selecting transformed image data from the first color model converter for other image area(s) of the source image than the target image area.

18 Claims, 4 Drawing Sheets

(56) References Cited

U.S. PATENT DOCUMENTS

| | | | | |
|---|---|---|---|---|
| 5,621,545 | A | * | 4/1997 | Motta et al. ............... 358/518 |
| 5,790,265 | A | * | 8/1998 | Shikakura ............. 358/426.09 |
| 6,285,462 | B1 | * | 9/2001 | Balasubramanian et al. . 358/1.9 |
| 2005/0062777 | A1 | * | 3/2005 | Tsai ............................ 347/15 |
| 2006/0071937 | A1 | * | 4/2006 | Tin ............................. 345/591 |
| 2006/0132874 | A1 | * | 6/2006 | Ishikawa .................... 358/518 |
| 2006/0146196 | A1 | * | 7/2006 | Suenaga et al. ........... 348/624 |
| 2007/0109563 | A1 | * | 5/2007 | Suenaga et al. ............ 358/1.9 |
| 2007/0279659 | A1 | * | 12/2007 | Hasegawa et al. .......... 358/1.9 |
| 2007/0296835 | A1 | * | 12/2007 | Olsen et al. ................ 348/234 |
| 2008/0007748 | A1 | * | 1/2008 | Borg et al. .................. 358/1.9 |
| 2008/0024596 | A1 | * | 1/2008 | Li et al. ....................... 348/47 |
| 2008/0024614 | A1 | * | 1/2008 | Li et al. ................... 348/207.99 |
| 2008/0044101 | A1 | * | 2/2008 | Huang et al. .............. 382/274 |
| 2009/0003730 | A1 | * | 1/2009 | Pande et al. ............... 382/298 |
| 2010/0194993 | A1 | * | 8/2010 | Kuno ......................... 348/708 |

OTHER PUBLICATIONS

PCT International Preliminary Report on Patentability, dated Jul. 2, 2009, in connection with International Application No. PCT/EP2008/001693.

Fujitsu: "Display Controller Block in Fujitsu's GDCs: Salient Features" [Online] Mar. 13, 2006, XP002455386. Retrieved from the Internet: URL:http://web.archive.org/web/20060313033346/http://www.fujitsu.com/downloads/MICRO/fma/pdf/FujitsuGDCs.pdf [retrieved on Oct. 17, 2007].

ATI Technologies, Inc.: "The Avivo Display Engine" [Online] Jan. 20, 2007, XP002455295. Retrieved from the Internet: URL:http://web.archive.org/web/20070120035045/http://ati.amd.com/technology/avivo/pdf/Avivo_Display_Engine_Whitepaper_v2_final.pdf [retrieved on Oct. 16, 2007].

Wikipedia: "Alpha compositing" [Online] Mar. 6, 2007, XP002455296. Retrieved from the Internet: URL: http://en.wikipedia.org/w/index.php?title=Alpha_compositing&oldid=113077720 [retrieved on Oct. 17, 2007].

Article 94(3) EP Communication, dated Jun. 30, 2011, in connection with counterpart European Patent Application No. 07 109 127.6-2202.

Blinn, J.F. "Compositing, part 1: theory", IEEE Computer Graphics and Applications, IEEE Service Center, New York, NY, US, vol. 14, No. 5, Sep. 1, 1994, pp. 83-87, XP002212541, ISSN: 0272-1716, DOI: DOI:10.1109/38.310740.

* cited by examiner

DISPLAY CONTROLLER, ELECTRONIC APPARATUS AND METHOD FOR CREATING A TRANSLUCENCY EFFECT USING COLOR MODEL TRANSFORM

CROSS-REFERENCE TO RELATED APPLICATIONS

This application claims priority under 35 U.S.C. §119 to European Patent Application No. 07109127.6 filed May 29, 2007, which is hereby incorporated herein by reference in its entirety. This application also claims the benefit of U.S. Provisional Application Nos. 60/893,421, filed Mar. 7, 2007 and 60/940,703, filed May 30, 2007, each of which is hereby incorporated herein by reference in its entirety.

TECHNICAL FIELD

The present invention relates to the field of image processing, and in particular to a display controller, as well as an associated electronic apparatus and method, for creating a translucency effect for a target image area of a source image containing image data expressed in a first color model.

BACKGROUND

Alpha blending, or alpha composition, is a common way to create a translucency effect in a resulting destination image by mixing pixels from two different image sources. The alpha value is used to determine how much each source pixel should contribute to the destination pixel. True alpha blending can therefore be expressed as $$\text{Destination\_pixel} = \text{source\_1\_pixel} \times \text{alpha} + \text{source\_2\_pixel} \times (1-\text{alpha}) \quad \text{(Equation 1)}$$

The value of alpha could be either constant for the entire image, or the value of alpha could change for each pixel.

When it is desired to create alpha blending effects on the display of an electronic apparatus such as, for instance, a mobile terminal, one option is to implement true alpha blending functionality in hardware. However, hardware implementation has its expenses, and since it can often be expected that alpha blending effects will not be that frequently used, it may not be worth the expense to implement true alpha blending functionality in hardware. If the electronic apparatus lacks such dedicated alpha blending hardware, it can alternatively be done in software. However, a drawback of this is that true alpha blending requires much processing power, particularly if alpha blending is to be performed for sequences of digital images in real-time (such as in the viewfinder of a digital camera, or for a video call). Extensive processing power may not be available, particularly when the electronic apparatus is a miniaturized, portable one (for instance a mobile terminal).

Thus, there is a need for an alternative to performing true alpha blending either in dedicated hardware or in software.

SUMMARY

It is an object of the invention to eliminate or alleviate at least some of the above disadvantages and to provide an improved display controller, electronic apparatus and method for creating a translucency effect for a target image area of a source image.

As a concept behind the invention, instead of creating the translucency effect by way of dedicated hardware or software for true alpha blending functionality, beneficial use is made of the fact that an electronic, image-displaying apparatus will typically have hardware-based color model transformation functionality, since the image sources thereof provide source images which are expressed in a different color model than the one that the display is designed for. Typically, image sources such as camera images or video streams use a composite color model such as YUV (i.e., a color model which defines a color space in terms of one luminance (Y) and two chrominance color components (U and V)), whereas the display will use an additive color model such as RGB (i.e., a color model which defines a color space in terms of three primary colors (Red, Green, Blue)). Thus, the present inventor has realized that a hardware-based YUV-RGB transform can be used in a novel way to create a translucency effect that mimics alpha blending (with constant alpha).

One aspect of the present invention is a display controller configured for creating a translucency effect for a target image area of a source image containing image data expressed in a first color model. The display controller has:

a first color model converter adapted for color model transformation of said image data from said first color model to a second color model based upon a first predefined set of transformation coefficients, and a second color model converter adapted for color model transformation of said image data from said first color model to said second color model based upon a second predefined set of transformation coefficients, wherein the display controller is controllable to produce a destination image by selecting transformed image data from said second color model converter for said target image area and by selecting transformed image data from said first color model converter for another image area of said source image than said target image area.

The first and second predefined sets of transformation coefficients are designed such that a visually noticeable difference between the target image area and said another image area will be perceivable for a human user when the destination image is presented on a display which is compliant with the second color model. Thus, the display controller can be controlled to select from which source buffer each pixel shall be fetched before the pixel is sent to the display. By the possibility to select from which source buffer a pixel should be fetched and by applying different transformation coefficients, a function similar to constant alpha blend can be created. This will be explained in more detail in the Detailed Description section of this document.

Advantageously, the first color model is a composite color model having one luminance component and at least one chrominance component. In one embodiment, the first color model is YUV or any model in compliance therewith, such as YCbCr, YPbPr, YDbDr or YIQ.

In one or more embodiments, the second predefined set of transformation coefficients contains at least one luminance component-controlling coefficient having a value which is different from the value of a corresponding at least one luminance component-controlling coefficient of said first predefined set of transformation coefficients. This means that the second color model converter, when basing its color model transformation upon the second predefined set of transformation coefficients, will in this case generate transformed image data that has a visually noticeable difference in luminance (i.e. either noticeably brighter or noticeably darker) than transformed image data generated by the first color model converter which instead bases its color model transformation upon the first predefined set of transformation coefficients. Thus, in this case the translucency effect lies in this visually noticeable difference in luminance between the target image area and adjacent regions of the source image, outside of the target image area.

In one or more embodiments, the second predefined set of transformation coefficients contains at least one chrominance component-controlling coefficient having a value which is different from the value of a corresponding at least one chrominance component-controlling coefficient of said first predefined set of transformation coefficients. In this case, the generated translucency effect will instead be a visually noticeable difference in color between the target image area and adjacent regions of the source image, outside of the target image area. Embodiments are also possible where the second predefined set of transformation coefficients differs from the first predefined set of transformation coefficients both for at least one luminance component-controlling coefficient and for at least one chrominance component-controlling coefficient, such that the generated translucency effect consists in a combination of a difference in brightness and a difference in color.

The second color model may advantageously be an additive color model such as RGB or any model in compliance therewith.

In one or more embodiments, the display controller has a first image data input coupled to said first color model converter, and a second image data input coupled to said second color model converter, wherein the display controller is adapted to receive image data from said source image concurrently on both of said first and second image data inputs. In other words, when a translucency effect is to be generated, image data from the source image is loaded in parallel into a first image buffer, associated with the first image data input, as well as into a second image buffer, associated with the second image data input. With this arrangement, the display controller will have two fully parallel color model transformation paths (one which includes the first color model converter, and another which includes the second color model converter). In turn, this allows use of the display controller also for a different purpose than translucency effect creation; by instead loading different source images into the first and second image buffers, a destination image can be generated from a combination of such two different source images.

Such dual-purpose usage of the display controller is further facilitated in one or more embodiments, where the display controller has a control input for transformation coefficients, wherein the display controller is adapted, upon receipt of new transformation coefficients on said control input, to update said second set of predefined transformation coefficients of said second color model converter with the new transformation coefficients thus received.

The display controller described above may advantageously be provided in an electronic apparatus having a display. The electronic apparatus may, for instance, be embodied as a mobile terminal for a telecommunications system such as GSM, UMTS, D-AMPS, CDMA2000, FOMA or TD-SCDMA.

A second aspect of the present invention is a method of creating a translucency effect for a target image area of a source image containing image data expressed in a first color model. The method involves:

providing first and second sets of transformation coefficients designed for color model transformation from said first color model to a second color model;

loading image data of said source image into a first source image buffer as well as into a second source image buffer;

receiving image data from said first source image buffer in a first color model converter;

causing said first color model converter to perform color model transformation of the received image data using said first set of transformation coefficients;

receiving image data from said second source image buffer in a second color model converter;

causing said second color model converter to perform color model transformation of the received image data using said second set of transformation coefficients; and producing a destination image by selecting transformed image data from said second color model converter for said target image area and by selecting transformed image data from said first color model converter for another image area of said source image than said target image area.

Generally, the same or corresponding features that have been set out above for the first aspect of the invention are applicable also to the second aspect of the invention.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Objects, features and advantages of embodiments of the invention will appear from the following detailed description, reference being made to the accompanying drawings, in which.

DETAILED DESCRIPTION

Embodiments of the invention will be now described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Figure 1:
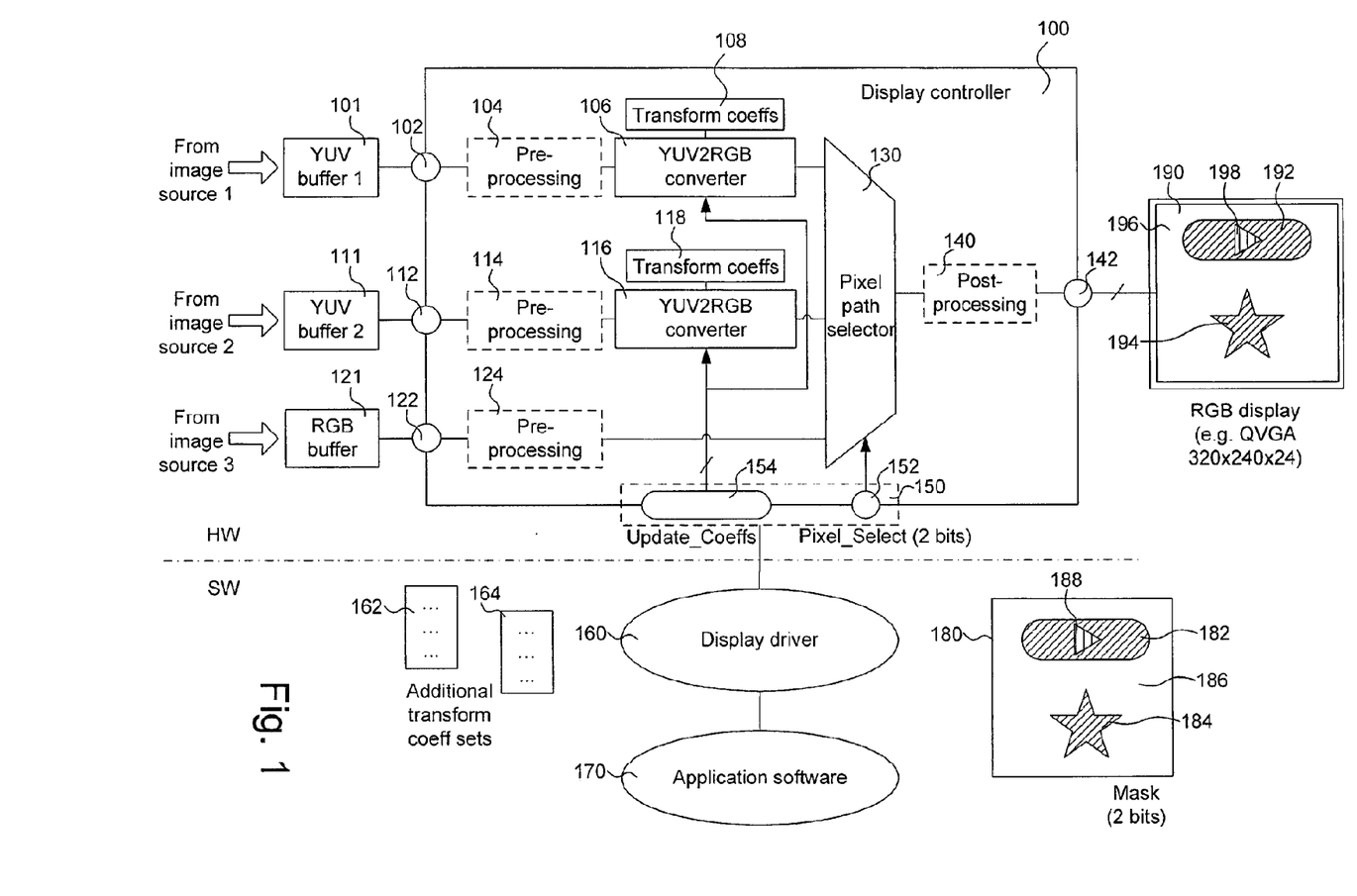
FIG. 1 is a schematic block diagram of a display controller according to one embodiment.
Figure 2:
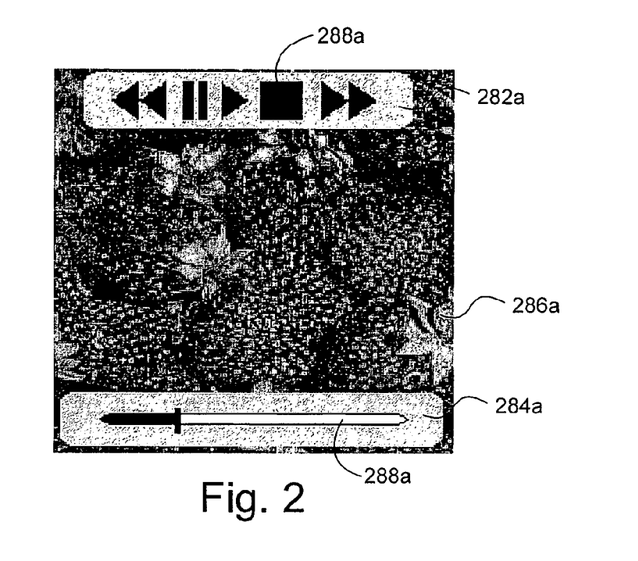
FIGS. 2 and 3 illustrate examples of how a destination image may look without and with, respectively, application of the alpha-blend-mimicking functionality according to the invention.

FIG. 1 illustrates an advantageous hardware design of a display controller 100 which may be used in accordance with the present invention to create an effect, or sensation, of alpha blending or other translucency (i.e. partial transparency) in a target image area of a digital image, even though the hardware of the display controller lacks support for true alpha blending.

The display controller 100 has YUV image data inputs 102 and 112. In addition, but optionally, the display controller 100 has an RGB image data input 122. The display controller 100 is intended to control a display 190, such as a QVGA 320× 240×24 RGB color display, to present digital images in RGB format. In order to send YUV data to the display 190, the data needs to be converted to RGB. A transform for converting the YUV pixels to RGB pixels looks like:

$$R = (Y + \text{offset}_Y) \cdot Y\text{factor}_R + (U + \text{offset}_U) \cdot U\text{factor}_R + (V + \text{offset}_V) \cdot V\text{factor}_R$$

$$B = (Y + \text{offset}_Y) \cdot Y\text{factor}_B + (U + \text{offset}_U) \cdot U\text{factor}_B + (V + \text{offset}_V) \cdot V\text{factor}_B$$

$$G = (Y + \text{offset}_Y) \cdot Y\text{factor}_G + (U + \text{offset}_U) \cdot U\text{factor}_G + (V + \text{offset}_V) \cdot V\text{factor}_G \quad \text{(Equation 2)}$$

Therefore, the display controller 100 has parallel color model transformation paths. Each path comprises a YUV to RGB color model converter 106 and 116, respectively. Optional preprocessing functionality 104, 114 (involving for instance scaling) may also be provided.

Each color model converter 106, 116 comprises hardware logic circuitry for applying a color model transform, like the one indicated above in Equation 2, to convert incoming source image data from YUV format to RGB format. To this end, each color model converter 106, 116 has an associated set of predefined transformation coefficients 108, 118 stored in a local hardware register, etc. These transformation coefficients are seen as $\text{offset}_a$ and $\text{bfactor}_c$ in the above Equation 2, where a=Y, U, V; b=Y, U, V; and c=R, G and B, and are consequently used in the actual transform calculation operations performed by the respective color model converter 106, 116.

The resulting transformed image data (in RGB format) is fed by the respective color model converter 106, 116 to an image (pixel) path selector 130. Corresponding image data from the optional RGB image data input 122 is also fed to the image path selector 130. As part of a control interface 150, the display controller 100 has a Pixel_Select control input 152, by means of which a current output from the image path selector 130 can be selected among the two YUV and one RGB input paths described above. Optional post-processing 140 (e.g. color depth adaptation) may take place, before the selected output is fed to an RGB image data output 142, which in turn may be connected to the display 190.

One reason for providing the display controller 100 with such two parallel YUV to RGB color model transformation paths 102-108 and 112-118 is to allow for simultaneous presentation of image data from two image sources on the display 190. A typical usage scenario is a video call. Thus, a first image source may be an incoming video stream received from a remote video call party over a mobile telecommunications network (e.g. network 17 of FIG. 4). Frame by frame, such first source image data is loaded into a first YUV buffer 101, which may reside in local memory in an electronic apparatus (e.g. mobile terminal 1 of FIG. 4) in which the display controller 100 is comprised. A second image source may be still images captured by an integrated camera (e.g. camera 9 in the mobile terminal 1 of FIG. 4), and second source image data is thus loaded into a second YUV buffer 111.

By defining a mask 180, a software application 170 (e.g. a video call handling application in the case above) may together with a display driver 160 command the display controller 100 over the Pixel_Select control input 152 to use certain image areas from the first YUV buffer 101 as well as other image areas from the second YUV buffer 111 when rendering destination image data for output on the image data output 142. In the case of a video call, this may for instance be used for incorporating a viewfinder image of the local video call party (as captured by the integrated camera 9) into the presented incoming video stream from the remote video call party.

If no translucency effect (e.g. alpha blend mimicking) is to be created, the first and second color model converters 106 and 116 will typically use identical transformation coefficients 108 and 118. In other words, identical color model transforms will be applied to the first source image data (e.g. video stream) from the first YUV buffer 101 and to the second source image data (e.g. camera image) from the second YUV buffer 111.

It is however possible to cause for instance the second color model converter 116 to apply a different color model transform than the first converter 106, by updating the transformation coefficients 118 of said second color model converter 116, so that its coefficients are no longer identical to those of the first converter 106. Within the context of the present invention, this opportunity is used to mimic alpha blending by creating a translucency effect in the destination image data provided at the image data output 142 and to be presented on the display 190. This will now be explained in more detail.

Figure 3:
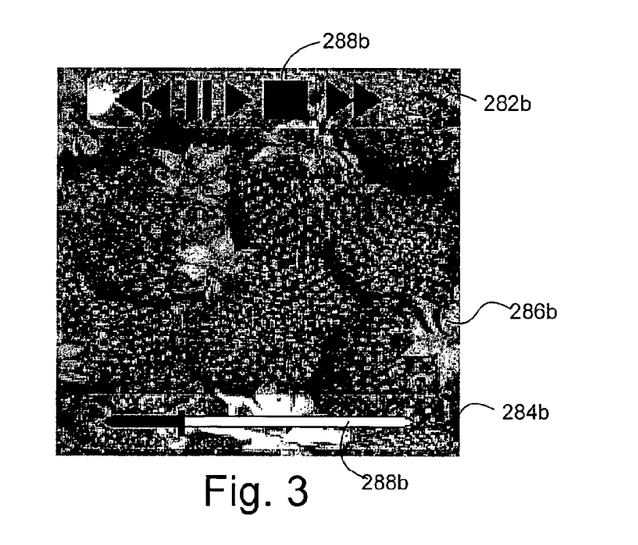

When a translucency effect is to be created, the same image data is conveniently fed to both YUV buffers 101, 111. Such image data may for instance be part of a video sequence captured by the integrated camera 9 and viewed in a video player application 170 (a display screen snapshot of which is seen in FIG. 3). For at least one target image area of a current source image, for which target image area it is desired to create a translucency (alpha blending mimic) effect in the destination image resulting at image data output 142, the mask 180 used by the application 170 and display driver 160 will define a corresponding mask area 182, 184.

In more detail, all pixels of such mask areas 182, 184 (which occur twice in FIG. 1 and are marked with inclined hatching in the drawing) will be represented by a particular two-bit value in the mask 180, which upon feeding onto the Pixel_Select control input 152 of the display controller 100 will indicate to the image path selector 130 thereof that converted image data from the second color model transformation path 112-118—rather than from the first color model transformation path 102-108—shall be let through the image path selector 130. As a result, when the destination image is presented on the display 190 as shown in FIG. 1, the destination image will contain target image areas 192, 194 resulting from the converted image data from the second color model transformation path 112-118.

On the other hand, other areas of the mask 180 than the aforementioned areas 182, 184 (i.e. area 186, shown without any hatching in FIG. 1) will be represented by a different two-hit value in the mask 180, thereby indicating to the image path selector 130 to instead use converted image data from the first color model transformation path 102-108 for such other areas when producing the destination image for presentation on the display 190. The image areas in the presented image that result from the converted image data from the first color model transformation path 102-108 are shown as 196 in FIG. 1.

Optionally, a third two-bit value may be used in mask 180 for representing use of source image data from the RGB buffer 121 for certain areas of the destination image to be created. Such certain areas in the mask 180 are indicated with vertical hatching at 188 in FIG. 1, and the resulting areas in the destination image are seen at 198.

When a destination image, which according to mask 180 is to contain a translucency effect, is to be rendered by the display controller 100, the application 170 and/or display driver 160 may have to update the transformation coefficients 118 of the second color model converter 116, so that both controllers will not contain identical transformation coefficients (otherwise, since the same source image data is loaded into both YUV buffers 101, 111, no visible translucency effect would be generated). To this end, the application 170 and/or display driver 160 may have access to additional pre-defined sets 162, 164 of transformation coefficients, where one set 162 may contain the "normal" coefficients for use in applications where no translucency effect is required (such as for instance the video call scenario referred to above), whereas another set 164 may contain the "special" transformation coefficients by way of which a visually noticeable translucency effect will appear in the resulting destination image when presented on the display 190.

The display controller 100 therefore has an Update_Coeffs control input 154 in its control interface 150 for receiving such new transformation coefficients 162 or 164 to replace or update the existing coefficients 118 of the second color model converter 116. Of course, all references to "first" and "second" above may be reversed in other embodiments.

A more realistic example of how the resulting destination image may look like is given in FIG. 3, where 286b indicates image areas originating from the first color model transformation path 102-108 (having used the "normal" transformation coefficients as its coefficients 108), 282b and 284b indicate image areas originating from the second color model transformation path 112-118 (having used the "special" transformation coefficients as its coefficients 118), and 288b indicates image areas originating from the RGB buffer 121.

The exact values of the "special" transformation coefficients will have to be derived and evaluated in view of the translucency effect which it is desired to obtain (in other words, depending on what type of visual difference it is desired that a presented image area 192, 194 resulting from a transformation using the "special" transformation coefficients shall give, as compared to what it would have looked like if it had been transformed using the "normal" transformation coefficients instead).

For instance, one feasible translucency effect may be to design the "special" transformation coefficients so that they will yield a difference in brightness (i.e. either a darker or a brighter impression) compared to the "normal" transformation coefficients. Such a translucency effect may be obtained by predominantly changing the Y component-controlling coefficients in Equation 2 (i.e. offset$_Y$, Yfactor$_R$, Yfactor$_B$, and Yfactor$_G$), together with certain adjustments of the other coefficients as appropriate. Such derivation and evaluation of appropriate values of the "special" transformation coefficients is believed to be well within reach of a man skilled in the art exercising only routine activity. For example, if the "normal" transformation coefficients (i.e. the transformation coefficients 108 of the first color model converter 106) are set as is shown in the transformation matrix below:

$R=(Y+0)\cdot256+(U+0)\cdot0+(V+0)\cdot359$ $B=(Y+0)\cdot256+(U+0)\cdot-81+(V+0)\cdot-123$ $G=(Y+0)\cdot256+(U+0)\cdot198+(V+0)\cdot0,$ then, to yield a slightly lighter translucency effect (i.e., the "special" transformation coefficients (i.e. the transformation coefficients 118 of the second color model converter 116) can be set as follows:

$R=(Y+0)\cdot463+(U+0)\cdot0+(V+0)\cdot359$ $B=(Y+0)\cdot463+(U+0)\cdot-81+(V+0)\cdot-123$ $G=(Y+0)\cdot463+(U+0)\cdot198+(V+0)\cdot0,$ It is to be noticed that whereas the multiplying transformation coefficients above (corresponding to the bfactor$_c$ coefficients in the above Equation 2, where b=Y, U, V; and c=R, G and B) have been expressed as 16-bit integer values in the above example, it may in a real implementation be convenient to handle them as 8-bit integer values. This may be achieved, as is readily realized by a skilled person, by an 8-bit downshifting of either the resulting equation values R, B, and C, or each term in the right part of the equations.

Another feasible translucency effect may be to instead provide a difference in color. This may instead involve modifying predominantly the transformation coefficients controlling the U and V components in Equation 2.

Figure 4:
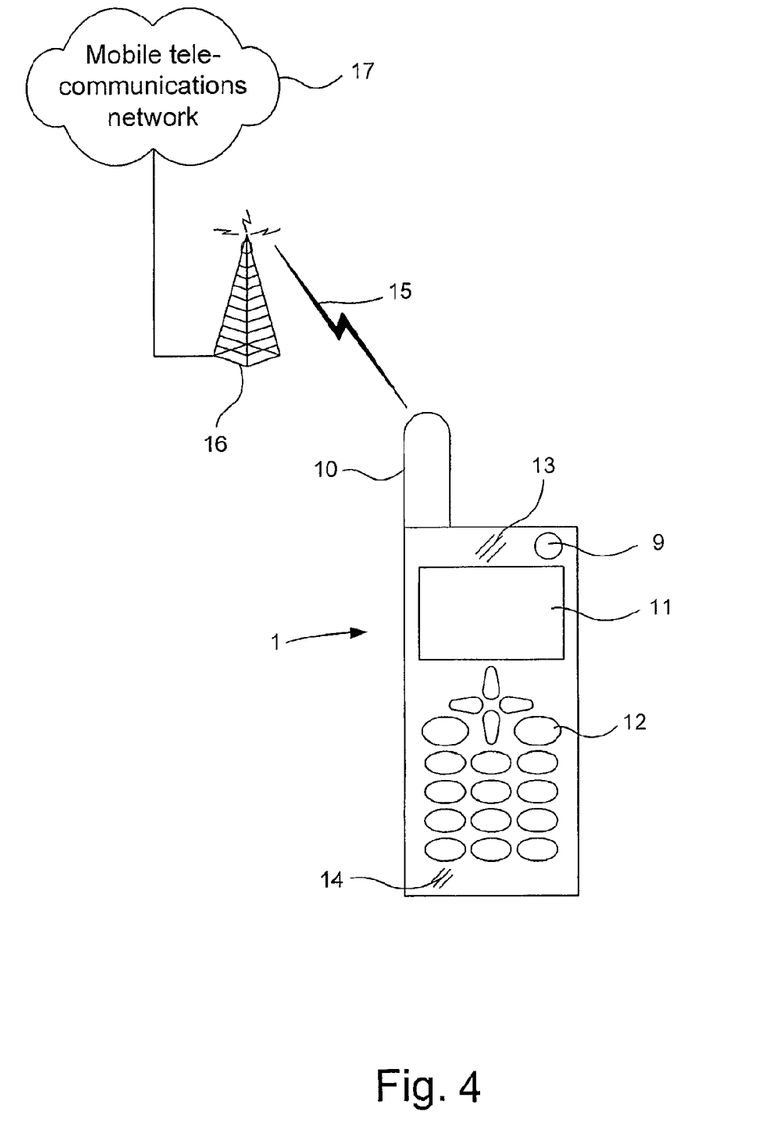
FIG. 4 is a schematic front view of a mobile terminal—which may contain a display controller according to FIG. 1—and an example environment in which it may typically operate.

FIG. 4 illustrates an electronic apparatus 1 which comprises the display controller 100 and display 190 described above. Generally, the display controller 100 may be comprised in any electronic apparatus having a need for producing an effect of translucency in a presented image without using software or hardware based, true alpha blending. Thus, while the electronic apparatus 1 is embodied in FIG. 4 as a mobile terminal, and more specifically as a mobile telephone, it may just as well in other embodiments be comprised in other kinds of stationary, portable, or handheld equipment, such as a pager, a communicator, an electronic organizer, a smartphone, a personal digital assistant, a computer or a camera. These are only examples and not limiting of the invention.

FIG. 4 illustrates the mobile telephone 1 in a schematic front view and the environment in which it operates. The mobile telephone 1 comprises an antenna 10 mounted on the housing of the apparatus. Alternatively, the mobile telephone 1 may have an internal antenna mounted within the housing of the apparatus. The mobile telephone further comprises a display 11 (which may implement the aforementioned display 190), a keypad 12, a loudspeaker 13, and a microphone 14, which together provide a man-machine interface for operating the mobile telephone 1. Furthermore, the mobile telephone 1 has an integrated camera 9.

The mobile telephone 1 is adapted to connect to a mobile telecommunication network 17 via a wireless link 15 to a radio station (base station) 16. Hence, a user of the mobile telephone 1 may use conventional circuit-switched telecommunication services such as voice calls, data calls and fax transmissions, as well as packet-based services such as electronic messaging, Internet browsing, electronic commerce, etc. Additionally, the user may perform video calls with other users of video-enabled communication devices. To this end, the mobile telecommunication network 17 is compliant with a mobile telecommunication standard which supports video telephony, for instance UMTS (Universal Mobile Telecommunications System).

Figure 5:
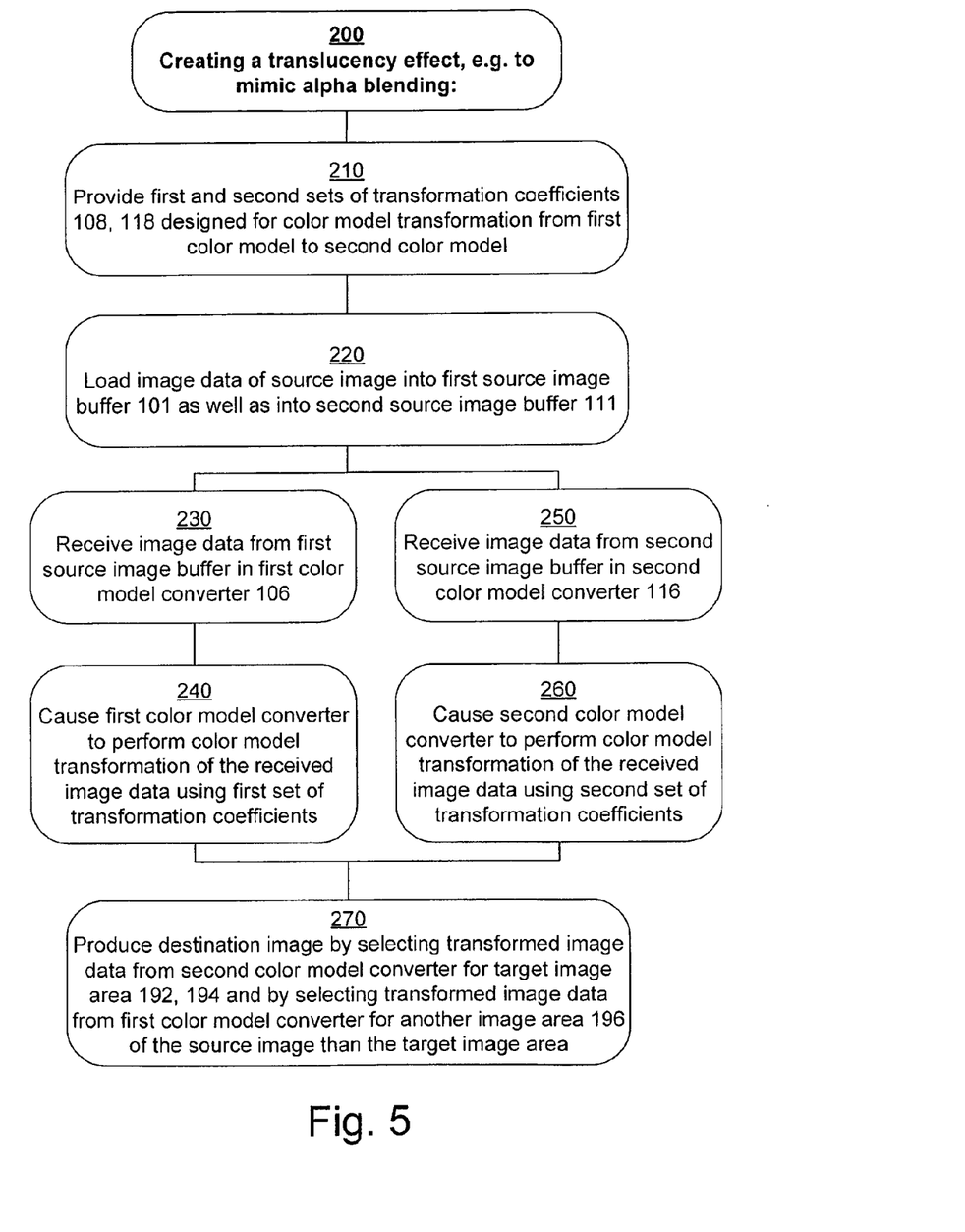
FIG. 5 is a schematic flowchart of a method according to one embodiment.

FIG. 5 is a schematic flowchart of a method 200, according to one embodiment, of creating a translucency effect (e.g. to mimic alpha blending). The disclosed embodiment uses the display controller 100 described above with respect to FIG. 1; however, other embodiments may use other hardware to perform the method of FIG. 5.

In step 210 of FIG. 5, the first and second sets of transformation coefficients 108, 118 are provided. As previously explained, these sets of transformation coefficients 108, 118 are designed for color model transformation from a first color model, such as YUV, to a second color model, such as RGB. In the disclosed embodiment, they are stored in a local hardware register, etc, associated with the first and second color model converters 106, 116, respectively. Again, as previously explained, the transformation coefficients of the second set 118 will not be identical to those of the first set 108; instead, one of the sets will contain the "normal" coefficients which are also used in applications where no translucency effect is required (such as for instance the video call scenario referred to above), whereas the other set will contain the "special" transformation coefficients by way of which a visually noticeable translucency effect will appear in the resulting destination image when presented on a display.

In step 220, image data of a source image is loaded into the first source image buffer 101 as well as into the second source image buffer 111. Thus, both buffers will contain identical image data. In step 230, the first color model converter 106 will receive image data from the first source image buffer 101 via the first YUV image data input 102, and perform a color model transformation of this image data from YUV to RGB using the first set of transformation coefficients 108 in step 240. In parallel to this, the second color model converter 116 will receive identical image data in step 250 from the second source image buffer 111 via the second YUV image data input 112, and perform a color model transformation of this image data from YUV to RGB using the second set of transformation coefficients 118 in step 260.

Then, in a step 270 the results from the parallel processing steps 230+240 and 250+260 will be combined to produce a destination image by selecting transformed image data from the second color model converter 116 for the target image area 192, 194 (as defined by areas 182 and 184 in mask 180) and by selecting transformed image data from the first color model converter 106 for other image area(s) 196 of the source image than the target image area. As previously explained, since the first and second sets of transformation coefficients 108, 118 have been chosen with a view to create a visually noticeable difference between the target image area 192, 194 and the other image area(s) 196, a translucency effect will appear for a human user when the destination image is presented on a display (such as the display 190) which is compliant with the second color model.

The invention has been described above with reference to some embodiments thereof. However, as is readily understood by a skilled person, other embodiments are also possible within the scope of the present invention, as defined by the appended claims. One such possible embodiment is a display controller configured for creating a translucency effect for a target image area of a source image containing image data expressed in a first color model, the display controller comprising means for converting source image data from image areas in said source image where no translucency effect is desired into first converted image data expressed in a second color model by applying a color model transform based upon a first predefined set of transformation coefficients;

means for converting source image data from said target image area in said source image where said translucency effect is desired into second converted image data expressed in said second color model by applying said color model transform based upon a second predefined set of transformation coefficients; and means for producing a destination image from said first converted image data and said second converted image data.

Another possible embodiment is a display controller configured for creating a translucency effect for a target image area of a source image containing image data expressed in a first color model, the display controller comprising means for providing first and second sets of transformation coefficients designed for color model transformation from said first color model to a second color model;

means for loading image data of said source image into a first source image buffer as well as into a second source image buffer;

means for receiving image data from said first source image buffer in a first color model converter;

means for causing said first color model converter to perform color model transformation of the received image data using said first set of transformation coefficients;

means for receiving image data from said second source image buffer in a second color model converter;

means for causing said second color model converter to perform color model transformation of the received image data using said second set of transformation coefficients; and means for producing a destination image by selecting transformed image data from said first color model converter for other image areas of said source image than said target image area and by selecting transformed image data from said second color model converter for said target image area.

Still another possible embodiment is a method of creating a translucency effect for a target image area of a source image containing image data expressed in a first color model, the method involving converting source image data from image areas in said source image where no translucency effect is desired into first converted image data expressed in a second color model by applying a color model transform based upon a first predefined set of transformation coefficients;

converting source image data from said target image area in said source image where said translucency effect is desired into second converted image data expressed in said second color model by applying said color model transform based upon a second predefined set of transformation coefficients; and producing a destination image from said first converted image data and said second converted image data.

Yet another possible embodiment is a method of creating a translucency effect for a target image area of a source image containing image data expressed in a first color model, the method involving providing first and second sets of transformation coefficients designed for color model transformation from said first color model to a second color model;

loading image data of said source image into a first source image buffer as well as into a second source image buffer;

receiving image data from said first source image buffer in a first color model converter;

causing said first color model converter to perform color model transformation of the received image data using said first set of transformation coefficients;

receiving image data from said second source image buffer in a second color model converter;

causing said second color model converter to perform color model transformation of the received image data using said second set of transformation coefficients; and producing a destination image by selecting transformed image data from said first color model converter for other image areas of said source image than said target image area and by selecting transformed image data from said second color model converter for said target image area.

The invention claimed is:

1. A display controller configured for creating a translucency effect for a target image area of a source image containing image data expressed in a first color model, the display controller comprising:
   a first color model converter adapted for color model transformation of said image data from said first color model to a second color model based upon a first predefined set of transformation coefficients, and
   a second color model converter adapted for color model transformation of said image data from said first color model to said second color model based upon a second predefined set of transformation coefficients, wherein the display controller is controllable to produce a destination image by selecting transformed image data from said second color model converter for said target image area and by selecting transformed image data from said first color model converter for another image area of said source image than said target image area, and wherein said first and second predefined sets of transformation coefficients are designed such that a visually noticeable difference between the target image area and said another image area will be perceivable for a human user when the destination image is presented on a display which is compliant with the second color model.

2. The display controller according to claim 1, the first color model being a composite color model having one luminance component and at least one chrominance component.

3. The display controller according to claim 2, wherein the first color model is YUV or any model in compliance therewith.

4. The display controller according to claim 2, wherein the second predefined set of transformation coefficients contains at least one luminance component-controlling coefficient having a value which is different from the value of a corresponding at least one luminance component-controlling coefficient of said first predefined set of transformation coefficients.

5. The display controller according to claim 2, wherein the second predefined set of transformation coefficients contains at least one chrominance component-controlling coefficient having a value which is different from the value of a corresponding at least one chrominance component-controlling coefficient of said first predefined set of transformation coefficients.

6. The display controller according to claim 1, wherein the second color model is an additive color model such as RGB or any model in compliance therewith.

7. The display controller according to claim 1, comprising a first image data input coupled to said first color model converter, and a second image data input coupled to said second color model converter, wherein the display controller is adapted to receive image data from said source image concurrently on both of said first and second image data inputs.

8. The display controller according to claim 1, comprising a control input for transformation coefficients, wherein the display controller is adapted, upon receipt of new transformation coefficients on said control input, to update said second set of predefined transformation coefficients of said second color model converter with the new transformation coefficients thus received.

9. An electronic apparatus having a display, comprising the display controller according to claim 1.

10. The electronic apparatus according to claim 9, embodied as a mobile terminal.

11. A method of creating a translucency effect for a target image area of a source image containing image data expressed in a first color model, the method comprising:

providing first and second sets of transformation coefficients designed for color model transformation from said first color model to a second color model;

loading image data of said source image into a first source image buffer as well as into a second source image buffer;

receiving image data from said first source image buffer in a first color model converter;

causing said first color model converter to perform color model transformation of the received image data using said first set of transformation coefficients;

receiving image data from said second source image buffer in a second color model converter;

causing said second color model converter to perform color model transformation of the received image data using said second set of transformation coefficients; and producing a destination image by selecting transformed image data from said second color model converter for said target image area and by selecting transformed image data from said first color model converter for another image area of said source image than said target image area, wherein said first and second sets of transformation coefficients are designed such that a visually noticeable difference between the target image area and said another image area is perceivable for a human user when the destination image is presented on a display which is compliant with the second color model.

12. The method according to claim 11, the first color model being a composite color model having one luminance component and at least one chrominance component.

13. The method according to claim 12, wherein the first color model is YUV or any model in compliance therewith.

14. The method according to claim 12, wherein the second predefined set of transformation coefficients contains at least one luminance component-controlling coefficient having a value which is different from the value of a corresponding at least one luminance component-controlling coefficient of said first predefined set of transformation coefficients.

15. The method according to claim 12, wherein the second predefined set of transformation coefficients contains at least one chrominance component-controlling coefficient having a value which is different from the value of a corresponding at least one chrominance component-controlling coefficient of said first predefined set of transformation coefficients.

16. The method according to claim 11, wherein the second color model is an additive color model such as RGB or any model in compliance therewith.

17. The method according to claim 11, wherein said steps of receiving image data from said first source image buffer and causing said first color model converter to perform color model transformation of the received image data are performed concurrently with said steps of receiving image data from said second source image buffer and causing said second color model converter to perform color model transformation of the received image data.

18. The method according to claim 11, comprising:

receiving new transformation coefficients on a control input; and updating said second set of predefined transformation coefficients of said second color model converter with the received new transformation coefficients.

* * * * *

UNITED STATES PATENT AND TRADEMARK OFFICE
CERTIFICATE OF CORRECTION

PATENT NO. : 8,749,575 B2  
APPLICATION NO. : 12/527859  
DATED : June 10, 2014  
INVENTOR(S) : Loven Svensson It is certified that error appears in the above-identified patent and that said Letters Patent is hereby corrected as shown below:

On the Title Page, item (73), under "Assignee", in Column 1, Line 1,
delete "Ericssson" and insert -- Ericsson --, therefor.

In the Specification

In Column 5, Line 5, in Equation 2, delete "offset$^V$)·" and insert -- offset$_V$)· --, therefor.

In Column 5, Line 8, in Equation 2, delete "offset$^V$)·" and insert -- offset$_V$)· --, therefor.

In Column 5, Line 11, in Equation 2, delete "offset$^V$)·" and insert -- offset$_V$)· --, therefor.

In Column 6, Line 47, delete "two-hit" and insert -- two-bit --, therefor.

In Column 8, Line 6, delete "C," and insert -- G, --, therefor.

Signed and Sealed this
First Day of September, 2015

Michelle K. Lee
*Director of the United States Patent and Trademark Office*